US012746840B2

(12) United States Patent
Lee et al.

(10) Patent No.: US 12,746,840 B2
(45) Date of Patent: Sep. 29, 2026

(54) ELECTRIC VEHICLE CHARGING STATION IDENTIFICATION

(71) Applicant: PowerFlex Systems, LLC, San Diego, CA (US)

(72) Inventors: Zachary Jordan Lee, Altadena, CA (US); John Horn, San Diego, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 581 days.

(21) Appl. No.: 18/356,606

(22) Filed: Jul. 21, 2023

(65) Prior Publication Data

US 2024/0123853 A1 Apr. 18, 2024

Related U.S. Application Data

(60) Provisional application No. 63/416,806, filed on Oct. 17, 2022.

(51) Int. Cl.

| | |
|---|---|
| ***B60L 53/62*** | (2019.01) |
| ***B60L 53/14*** | (2019.01) |
| ***B60L 53/65*** | (2019.01) |
| ***B60L 53/66*** | (2019.01) |

(52) U.S. Cl.

CPC ............... *B60L 53/62* (2019.02); *B60L 53/14* (2019.02); *B60L 53/65* (2019.02); *B60L 53/66* (2019.02)

(58) Field of Classification Search

CPC .......... B60L 53/62; B60L 53/14; B60L 53/66; B60L 53/65

USPC .......................................................... 320/109

See application file for complete search history.

(56) References Cited

U.S. PATENT DOCUMENTS

| | | | | |
|---|---|---|---|---|
| 2020/0122598 | A1* | 4/2020 | Lu | B60L 53/665 |
| 2020/0282849 | A1* | 9/2020 | Niederl | B60L 53/16 |
| 2024/0391344 | A1* | 11/2024 | Dai | B60L 53/66 |

* cited by examiner

*Primary Examiner* — Nathaniel R Pelton

(74) *Attorney, Agent, or Firm* — Dinsmore & Shohl, LLP

(57) ABSTRACT

Certain aspects of the present disclosure provide techniques for electric vehicle charging management. In some examples, a method includes detecting a charge session associated with a charging station; generating an encoded identification message that includes an identifier; sending the encoded identification message to the charging station, the encoded identification message configured to cause the vehicle connected to the charging station to alter a battery charging rate based on the identifier; receiving telematics data from the vehicle, the telematics data including the battery charging rate; decoding the identifier from the battery charging rate; and assigning the charge session to an account associated with the vehicle based on the decoded identifier.

20 Claims, 13 Drawing Sheets

ELECTRIC VEHICLE CHARGING STATION IDENTIFICATION

CROSS REFERENCE

This application claims the benefit of U.S. Provisional Application Ser. No. 63/416,806, filed on Oct. 17, 2022, which is hereby incorporated by reference in its entirety.

INTRODUCTION

Aspects of the present disclosure relate to systems and methods for automatic charge management.

Electric vehicles (EVs), including plug-in hybrid and fully electric vehicles, are increasing in popularity around the world. It is expected that the proportion of new EVs sold each year out of the total number of vehicles sold will continue to rise for the foreseeable future. Moreover, while EV operators are primarily non-commercial at present (e.g., personal vehicles), commercial vehicle operators are increasingly adding EVs to their fleets for all sorts of commercial operations, thus adding to the number of EVs in operation throughout the world.

The shift from internal combustion engine (ICE)-powered vehicles to EVs requires significant supporting infrastructure anywhere EVs are operated. For example, electric vehicle charging stations, sometimes referred to as electric vehicle supply equipment (EVSE), need to be widely distributed so that operators of EVs are able to traverse the existing roadways without issue.

Charging electric vehicles is different from refueling ICE vehicles in many ways. For example, charging may generally take longer on average than refilling a fuel tank in an ICE vehicle, the cost of electricity for charging may vary more frequently (e.g., hour-by-hour) than that of liquid fuels (e.g., day-by-day), and operators often charge their EVs at home, which is generally not possible for ICE vehicles. Consequently, EV charging infrastructure requires many new considerations and systems to work efficiently.

For example, EV charging providers desire to make the charging process as easy as possible for EV operators because complicated and tedious access to charging resources is a deterrent to EV adoption as well as a competitive disadvantage when multiple EV charging providers are available to EV operators. Similarly, EV charging providers need to manage their charging infrastructure in a way that encourages high utilization to be viable and competitive in the evolving market for such services.

SUMMARY

A first aspect provides a method for electric vehicle charging management, comprising: detecting a charge session associated with a charging station; generating an encoded identification message that includes an identifier, sending the encoded identification message to the charging station, the encoded identification message configured to cause a vehicle connected to the charging station to alter a battery charging rate based on the identifier; receiving telematics data from the vehicle, the telematics data including the battery charging rate; decoding the identifier from the battery charging rate; and assigning the charge session to an account associated with the vehicle based on the decoded identifier.

A second aspect provides a method for electric vehicle charging management, the method comprising: generating an encoded identification message that includes an identifier;

in response to detecting a vehicle plugging into a charging station, manipulating an operation of the vehicle based on the encoded identification message; and providing operation data from the vehicle, the operation data including indicia resulting from manipulating the operation of the vehicle based on the encoded identification message; wherein the identifier is decoded from the indicia, and a charge session is assigned to an account associated with the vehicle based on the decoded identifier.

A third aspect provides a charge management system, comprising: at least one processor; and memory comprising instructions that, when executed, cause the at least one processor to: detect a charge session associated with a charging station communicatively coupled to the charge management system; generate an encoded identification message that includes an identifier; send the encoded identification message to the charging station, the encoded identification message configured to cause a vehicle connected to the charging station to alter a battery charging rate based on the identifier; receive telematics data from the vehicle, the telematics data including the battery charging rate; decode the identifier from the battery charging rate; and assign the charge session to an account associated with the vehicle based on the decoded identifier.

A fourth aspect provides an electronic control unit of a vehicle, comprising: at least one processor; and memory comprising instructions that, when executed, cause the at least one processor to: generate an encoded identification message that includes an identifier; in response to detecting the vehicle plugging into a charging station, manipulate a battery recharge rate of the vehicle based on the encoded identification message; and provide the battery recharge rate to a charge management system; wherein the identifier is decoded from the battery recharge rate, and a charge session is assigned to an account associated with the vehicle based on the decoded identifier.

The following description and the related drawings set forth in detail certain illustrative features of one or more embodiments.

DESCRIPTION OF THE DRAWINGS

The appended figures depict certain aspects of one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
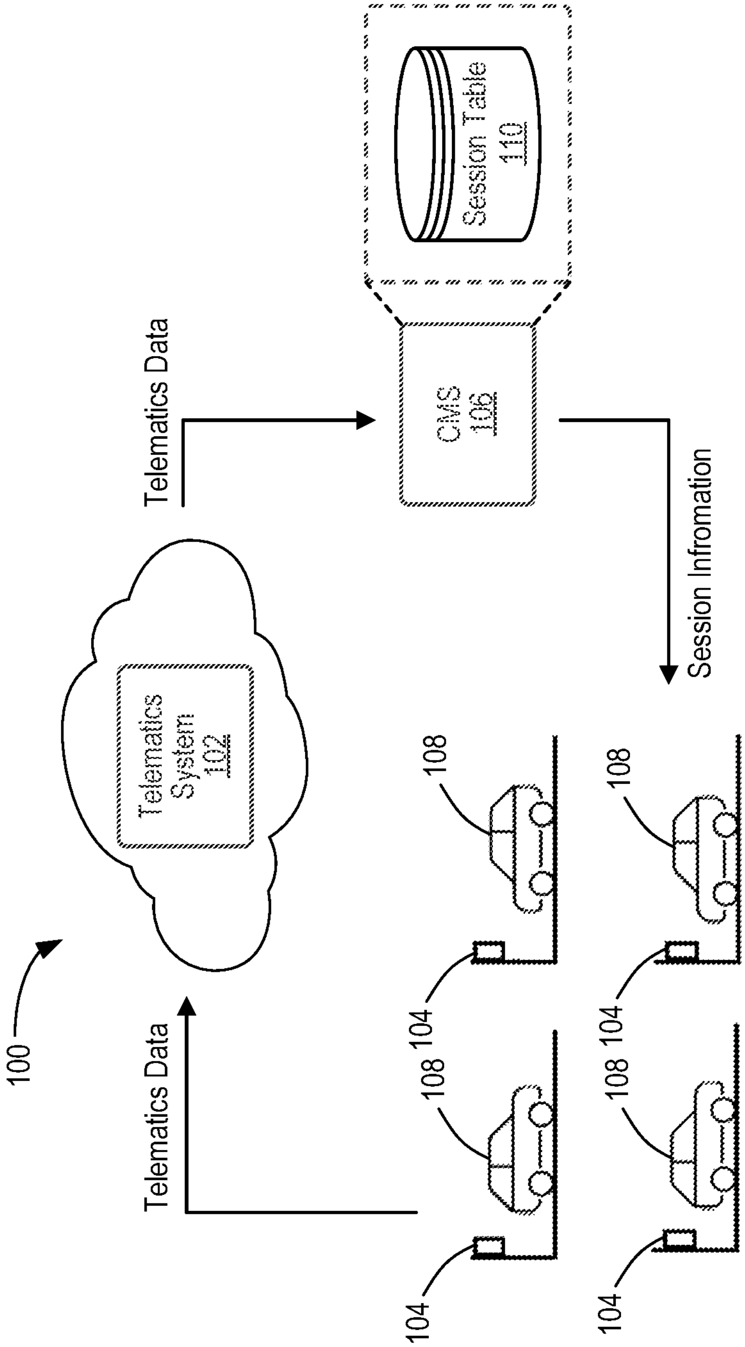
FIG. 1 depicts an example session management system that performs vehicle recognition and automatic charge management.

Aspects of the present disclosure relate to automatic charge management. Frequently, a charge consumer (e.g., the owner of an electric vehicle) desires seamless plug and play experience with the electric vehicle supply equipment (EVSE) (sometimes referred to as a "charging station"). The electric vehicle charging provider thus needs a method to identify the vehicle without requiring the charge consumer to take an affirmative action to identify themselves and/or the vehicle (e.g., presenting radio-frequency identification (RFID) cards and dongles, using credit card readers, mobile applications, and/or barcode/QR code readers, etc.) at the charging station.

Communication between the charging station and the electric vehicle is limited. Currently, the electric vehicle charging related standards used to design the electric vehicle charging station interface (e.g., SAE J1772 and IEC 62196, etc.) specify a signaling mechanism to facilitate the charging station communicating a maximum charging current that can be drawn by the electric vehicle. This signaling mechanism is unidirectional from the charging station to the electric vehicle. This signal is sometimes referred to as a "pilot signal." The electric vehicle decodes the pilot signal and limits the current it draws from the charging station to be less than or equal to the current allocated by the pilot signal. Other standards have been proposed to provide for bidirectional communication between the charging station and the electric vehicle (e.g., via powerline communication). However, even if adopted, these proposed standards require additional hardware in the electric vehicle and the charging station, and thus is not backward compatible with the existing stock of elective vehicles and charging stations. A backward compatible, plug-and-charge experience is valuable to users and charging operators as it requires no direct intervention by the users to identify themselves while still allowing charging operators to accept payment and/or control access to their charging stations.

With the increasing use of electric vehicles, recharging infrastructure is being installed in more locations and locations are increasingly supporting more charging stations. As a result, many electric vehicles can be plugged into many charging stations that are proximate to each other and/or managed as a charging network (e.g., a central source controlling the charging stations at one or more locations, etc.). Additionally, when locations are busy, vehicles can be added and removed from the charging network frequently. This creates a difficult environment to automatically determine which vehicle is plugged into which charging station without relying on customer interaction to self-identify at the charging station. In such a scenario, a standard pilot signal is not necessarily usable for this because it may be the same as pilot signals used on many other vehicles that are added to the charging network at the same time.

As described below, a charging management system (CMS) (which may also be referred to as a charge management system) pairs an electric vehicle with a charging session associated with a charging station based on a station identifier encoded into the pilot signal provided by the charging station. The CMS is directly (e.g., via a communication controller of vehicle, etc.) or indirectly (e.g., via a cloud-based telematics monitoring system, etc.) communicatively coupled to the telematics system of the electric vehicle. The vehicle telematics system facilitates remote monitoring of vehicle diagnostics that may include, for example, battery state of charge, battery voltage, charging power, charging input voltage, pilot signal, and charging state. The CMS encodes the station identifier into the pilot signal and recovers the station identifier via vehicle telematics. In some examples, the encoded station identifier causes the vehicle to operate in a manner that is detectible via the information available to the vehicle telematics (e.g., changing and/or manipulating charging characteristics, etc.).

However, relying on telematics data includes technical challenges, including: (i) many vehicles and/or telematics systems do not expose a pilot signal received from the charging station via telematics, (ii) the pilot signal is only an upper bound on the charging rate of vehicle, meaning the vehicle may, in some circumstances, not utilize the full charging rate specified by the pilot signal, (iii) the charging power could be affected by line voltage, losses, and other factors which mean it is a noisy derivative of the pilot signal sent to the vehicle, and/or (iv) CMS does not control the sampling frequency of the vehicle telematics such that the CMS cannot rely on a shared clock and cannot reliably detect fast transitions in the pilot signal. These technical challenges specifically arise in the realm of electric vehicle recharging mechanical and networking infrastructure that hinder two-way communication between a vehicle and systems that facilitate recharging of electric vehicles. The CMS overcomes these technical challenges to decode the station identifier and match the electric vehicle to the charging station that it is plugged into. The methods and systems described herein are rooted in networking and communication technology to overcome these technical challenges. The CMS provides the benefits of communication between the CMS and the vehicle without changing the hardware connection between the vehicle and the charging station.

Example Vehicle Recognition and Charge Management System Data Flow

FIG. 1 depicts an example system 100 that performs vehicle recognition and automatic charge management. The system 100 includes a telematics system 102, one or more charging stations 104, and a charging management system (CMS) 106.

The telematics system 102 communicatively couples to telematics systems of vehicles 108 that are configured to use the charging stations 104 managed by the CMS 106. For example, the processing unit and/or infotainment unit of the vehicle 108 may operate an application that connects the telematics control unit of the vehicle 108 to the telematics system 102 through a wireless connection (e.g., a wireless local area network, a cellular data network, a wide area network, etc.). In some examples, the vehicle 108 may include a separate electronic control unit (sometimes referred to as a "telematics control unit") to collect telematics data from the vehicle 108 and communicatively couple to the telematics system 102. The telematics system 102 collects telematics data from the vehicle 108 that includes, for example, data related to the state of the battery of the vehicle 108 (e.g., plugin state, charging rate, and/or state of charge, etc.) and data related to the operation of the vehicle 108 (e.g., location data, occupant data, diagnostic data, etc.). In some examples, the telematics data collected by the telematics system 102 includes the pilot signal received from the charging station 104.

The charging stations 104 are communicatively coupled to the CMS 106 by wired or wireless connections. In some examples, the charging stations 104 are wirelessly connected (e.g., via a wireless local area network connection, such as Wi-Fi®, a personal area network connection, such as Bluetooth®, or a mesh network connection, such as ZigBee®, etc.) to a local connection point or server. The local connection point or server may then be connected though a wired network or a wireless network (e.g., a cellular network, a wide area network etc.) to the CMS 106. The charging stations 104 interface with the vehicle 108 (e.g., via a plug) and provide power to recharge the battery of the vehicle 108. The charging stations 104 provide a pilot signal that affects the operation of the vehicle 108. For example, the pilot signal communicates to the vehicle 108 the maximum current that the vehicle 108 can draw from the charging station 104. Because the pilot signal sets a maximum current that the vehicle 108 is able to draw, this limits the amount of current that is available to recharge the battery of the vehicle 108. Thus, as more or less maximum current is available, the vehicle 108 reacts by, for example, increasing or decreasing the recharge rate of the battery.

The CMS 106 manages charging sessions and manages power utilization by the charging stations 104. The CMS 106 may control multiple charging stations 104 in a geographic area to provide charging to the vehicles 108 and balancing power capacity of the location by, for example, defining pilot signals among multiple vehicles 108 charging at the location to shape the power utilization. The CMS 106 tracks charge sessions generated by a vehicle 108 plugging into a charging station 104 in the charging network managed by the CMS 106. As described below, the CMS 106 pairs the charging sessions to a user account associated with the vehicle 108 without the user taking affirmative steps at the charging station to identify themselves. In the illustrated example, the CMS 106 includes a session table 110 that stores the charging sessions with the charging station 104 and a station identifier used at the charging station for the charging session. The session table 110 may be a lookup table, a database, or any other data structure to store the charging sessions in association with an identifier of the charging station 104 and the station identifier encoded into the pilot signal during the charge session.

When a vehicle 108 plugs into one of the charging stations 104, the charging station 104 sends a message to the CMS 106. The CMS 106 calculates a station identifier as a sequence of one or more pilot signals and sends the station identifier to the charging station 104. The CMS 106 may determine the station identifier before the vehicle 108 plugs into the charging station 104 or in response to the vehicle 108 plugging into the charging station 104. The charging station 104 communicates the station identifier by communicating the sequence of one or more pilot signals to the vehicle 108. In some examples, the CMS 106 generates the sequence of pilot signals as an ordered set of changes to the duty cycle of the pilot signal that changes at specified intervals. The pilot signal with the encoded station identifier causes the vehicle 108 to adjust its charging rate to stay at or below the charging rate as specified by the sequence of one or more pilot signals. As described below, the CMS 106 decodes the station identifier which was encoded in the pilot signal based on the effects to the operation of the vehicle 108 (e.g., charging rate in this example) as recorded by the telematics of the vehicle 108.

The vehicle 108 may not have a reliable connection to a network to facilitate communication with the telematics system 102 while the vehicle 108 is charging. For example, the charging stations 104 may be in a parking garage where the vehicle 108 does not receive reliable cellular service. In some examples, the telematics system 102 retrieves the telematics data from the period that the vehicle 108 was plugged into the charging station when the vehicle 108 reestablishes a suitable connection. In such examples, prior, unclaimed charging session may be associated with the vehicle 108 after the connection is reestablished.

Example Message Encoding Method

Figure 2:
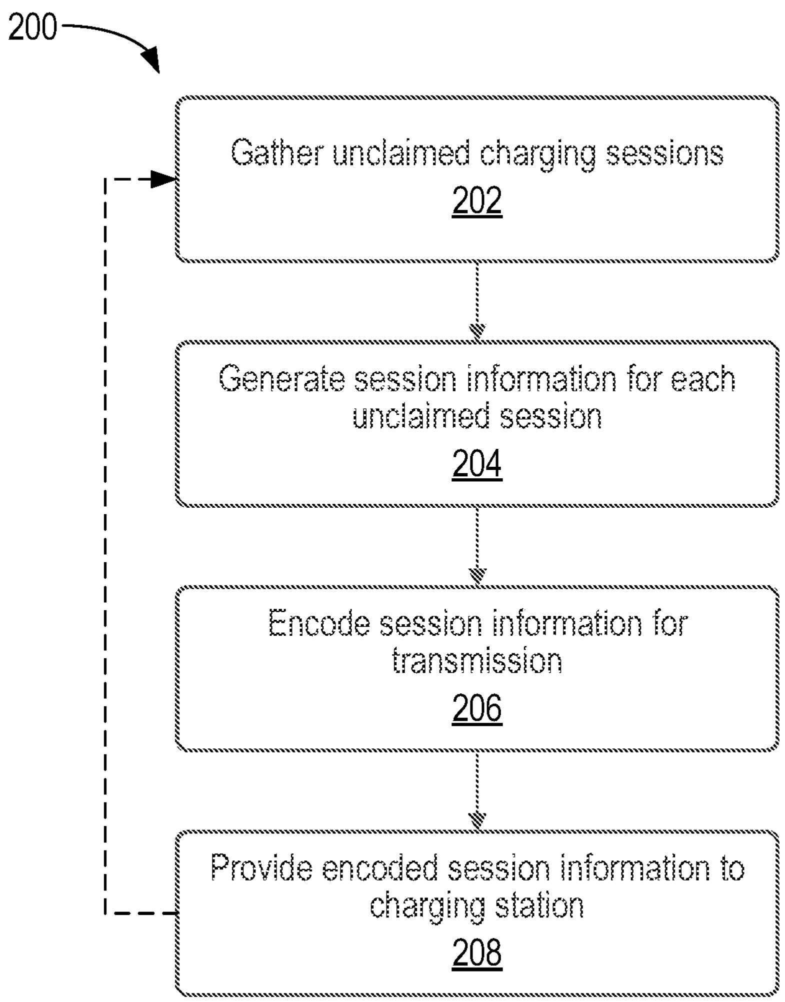
FIG. 2 is a flowchart of an example method to encode a station identifier into a pilot signal of a charging station.

FIG. 2 is a flowchart of an example method 200 to encode the station identifier into a pilot signal of a charging station, such as for a charge management system like system 100 described with respect to FIG. 1. In some examples, method 200 may be performed by a CMS, such as CMS 106 of FIG. 1.

Method 200 begins at step 202 with gathering all active charging sessions which are: (i) unclaimed and (ii) eligible for automatic session claiming. An example of determining eligibility for automatic session claiming is discussed in connection with FIG. 5 below.

Method 200 proceeds to step 204 with determining the value of the station identifier to send to each charging station 104 associated with an active, unclaimed charging session based, for example, on the current state of the system (e.g., the number of unclaimed charging sessions, the number of charging stations being managed, etc.) and its configuration (e.g., how the station identifier is determined and/or assigned as described below, etc.). In some examples, the CMS 106 uses a unique fixed identifier for each charging station at the location. For example, if there are 20 charging stations at a location, each station may have the identifier of 0, 1, 2, . . . , 19. In such examples, the station identifier that is included in the pilot signal for each station is its assigned identifier. In some examples, the station identifier is a sequence of values to be encoded in sequence of one or more pilot signals. In some examples, the CMS 106 uses a fixed identifier for each charging station that is globally unique. For example, if there are 100,000 stations globally managed by the CMS 106, each station may have the identifier of 0, 1, 2, . . . , 99,999. In some examples, the CMS 106 uses a dynamic local identifier which is determined by enumerating the unclaimed active sessions at the location. For example, if there are five active unclaimed sessions, the CMS 106 may use the values of 0, 1, 2, 3, and 4. In some examples, the CMS 106 uses a dynamic global identifier that is determined by enumerating the global unclaimed active sessions. For example, if there are 500 active unclaimed sessions globally, the CMS 106 may use identifiers 0, 1, 2, . . . , 499. While the examples above discuss the station identifier being an identifier that includes a single number, the identifier may be a unique sequence of values, for example 8-16-24.

In some examples, the station identifier is an alphanumeric value that is unique to each charging station 104, such as the string "1111-11-11-11." In some examples, the CMS 106 may generate a vector of randomly generated numbers long enough to be uniquely identifiable at the beginning of each charging session. These universally unique identifiers (UUIDs) act as a unique signature at the beginning and/or end of each session so there is no hard coded relationships between charging stations 104 and the station identifier. In some examples, the station identifier is an organized set of session data, such as a JSON Blob or an XML file. In some examples, the station identifier is a token or other data structure, encodable in binary form in the pilot signal, which is used to retrieve information about the charging station 104 and/or the particular charging session.

Method 200 proceeds to step 206 with encoding the station identifier as a sequence of one or more pilot signals for transmission to the vehicle 108. The station identifier encoded as a sequence of one or more pilot signals is sometimes referred to as an "encoded identification message." In some examples, the CMS 106 uses an encoding scheme to directly represent the message as an analog value or sequence of analog values. In an example encoding scheme for when the station identifier is an integer value, the CMS 106 configures the station identifier with respect to the range of the pilot signal. For example, the CMS 106 may pass the value of the station identifier through a clipping function. One example of such a clipping function is $f(x)=(x \% (r_{max}-r_{min}))+r_{min}$, where $r_{max}$ is the maximum allowable pilot signal and $r_{min}$ is the minimum allowable pilot signal.

In some examples, the CMS 106 converts the station identifier into a binary format to be encoded into the pilot signal. In some such examples, the CMS 106 uses an error correcting code when converting the message into binary format. The CMS 106 may use a compression algorithm to facilitate sending more information in the limited bandwidth available by manipulating the pilot signal in the manner described herein. When the station identifier is a binary format, the values or changes in values in the charging rate caused by a sequence of changes in the pilot signal communicate the binary data. In some examples, the binary message is converted into a line code. Examples include return-to-zero (RZ), non-return-to-zero (NRZ), or Manchester, etc. Examples include (i) encoding 1's as an increase in current as set by the pilot signal (e.g., transitioning from a maximum current of 8 amperes (A) to a maximum current of 16 A, etc.) and 0's as a decrease in current as set by the pilot signal (e.g., transitioning from a maximum current of 16 A to a maximum current of 8 A, etc.), or (ii) encoding 1's as a high value of current (e.g., 16 A) as set by the pilot signal, and 0's as a low value of current (e.g., 8 A) as set by the pilot signal with a no data level as a current, as set by the pilot signal, that is always returned to after transmitting a bit, (e.g., 12 A). For example, to encode a 1 into the pilot signal, the CMS 106 may define a sequence of pilot signals where the first pilot signal has a duty cycle of 13% (e.g., corresponding to a maximum current setting of 8 A) and the second pilot has a duty cycle of 26% (e.g., corresponding to a maximum current setting of 16 A).

Figure 3:
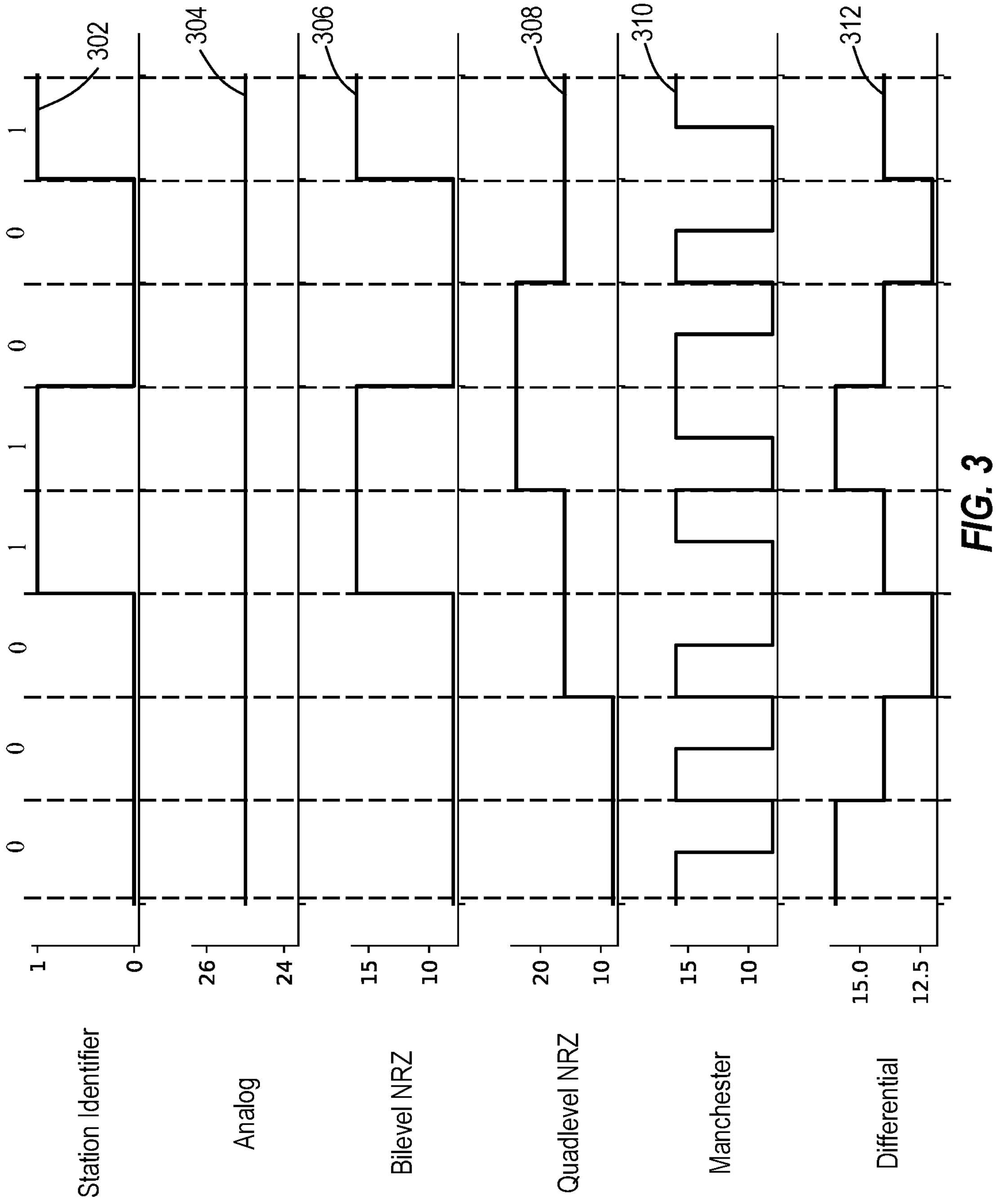
FIG. 3 depicts examples of encoding of the station identifier into the pilot signal of the charging station.

FIG. 3 illustrates an example station identifier being encoded into a sequence of one or more pilot signals. In the illustrated example, the station identifier is set to the numeric value of "25" (e.g., with a corresponding binary value of "00011001") as shown on plot 302. Plot 304 depicts the example station identifier as an analog signal (e.g., the pilot signal is set to facilitate a maximum current draw of 25 A). Plot 306 depicts the example station identifier being encoded using NRZ encoding with two levels, where 8 A represent "0" and 16 A represents "1". In this scheme 8A represents a 0 and 16A represents a "1". Plot 308 depicts the sample station identifier being encoded using NRZ encoding with four levels, where (i) 8 A represents "00," (ii) 16 A represents "01," (ii) 24 A represents "10," and (iv) 32 A represents "11." Plot 310 depicts the example station identifier being encoded using a Manchester encoding with two levels, where "1" is represented by a sequence that transitions from 8 A to 16 A and "0" is represented by a sequence that transitions from 16 A to 8 A. Because Manchester is self-clocking, the CMS 106 may sample without relying on synchronization (or a shared clock) between the sending and receiving ends of the transmission. Plot 312 depicts the example station identifier being encoded using differential encoding, where "1" is represented by an increase in maximum current draw set by the pilot signal and "0" is represented by a decrease in maximum current draw set by the pilot signal.

Returning to FIG. 2, method 200 proceeds to step 208 with sending the encoded identification message to the charging stations 104 via a wired or wireless commutation channel. The encoded identification message may be sent, for example, as a set of instructions that specify the sequence of pilot signals. The pilot signal(s) embodying the encoded identification message may be transmitted at the beginning of the charging session (e.g., before the pilot signal is used to manage the power load of the charging stations 104 at the location, etc.). In some examples, the pilot signal(s) embodying the encoded identification message may be transmitted in middle and/or end of the charging session to increase the probability of successful message transmission. The pilot signal encoded with station identifier may be transmitted to the vehicle 108 at any time while the vehicle 108 is plugged into the charging station 104 and drawing current from the charging station 104. In some such examples, the encoded message may include a special start and/or end sequence which signifies the start of a message transmission when detected by the CMS 106 through the telematics data of the vehicle 108.

Note that method 200 is just one example, and other methods including fewer, alternative, or additional steps consistent with this disclosure are possible.

Example Message Decoding Method

Figure 4:
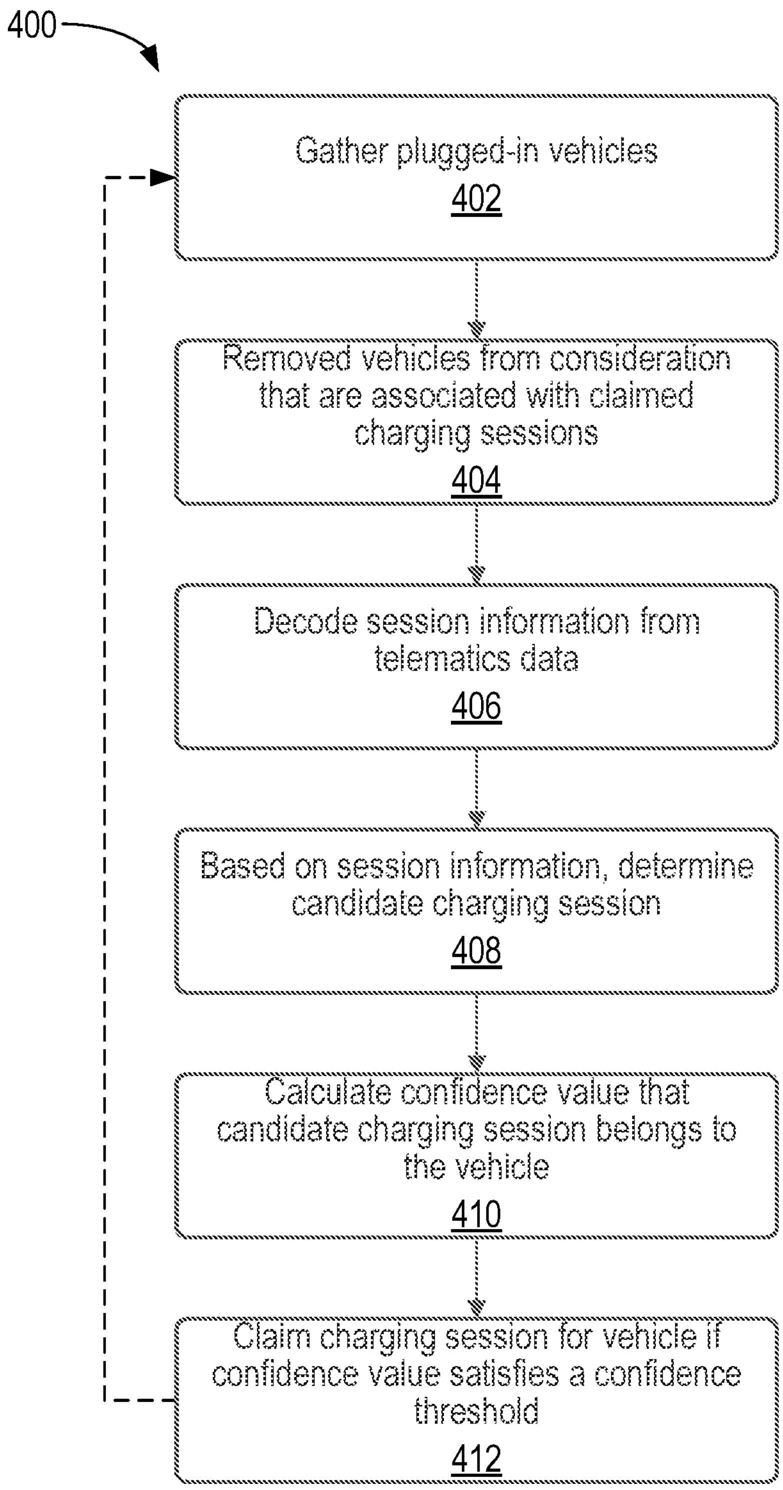
FIG. 4 is a flowchart of an example method to decode the pilot signal to recover the station identifier and claim a charging session.

FIG. 4 is a flowchart of an example method 400 to decode the pilot signal to recover the station identifier and claim a charging session. In some examples, method 400 may be performed by a CMS, such as CMS 106 of FIG. 1.

Method 400 begins at step 402 with gathering telematics data from the telematics system 102 for the vehicles 108 that are currently plugged in.

Method 400 proceeds to step 404 with filtering the list of plugged-in vehicles 108 to remove vehicles that are already associated with an active session. In one example, the output of this filtering is a list of vehicles that are plugged-in, but not assigned an active session.

In some examples, the CMS 106 removes vehicles 108 from consideration whose plug-in time is too far in the past to, for example, reduce the network and computation burden when vehicles plug in at other charging sites. In some examples, vehicles 108 are removed from consideration after 30 minutes. In some examples, the CMS 106 removes vehicles 108 from consideration based on the global positioning system (GPS) coordinates of the vehicle 108. In such examples, the CMS 106 defines a geofence around each location and removes vehicles 108 from consideration that are not within one of the geofences. For every vehicle 108 that is plugged into the charging stations 104, the CMS 106 pulls telematics data from the telematics system 102 and decodes the telematics data. When a large number of the vehicles 108 are plugged in, the CMS 106 is continuously pulling and decoding telematics data even though, for some vehicles 108, there is a reduced chance that the station identifier can be successfully decoded after a certain amount of plug-in time. Thus, to conserve network capacity and computational capacity, the CMS 106 removes vehicles 108 from consideration and stops pulling and decoding the corresponding telematics data.

In some cases, step 404 may include filtering the telematics data from the telematics system 102 to obtain telematics data (e.g., charging rate, pilot signal, location, plug-in time, etc.) of the vehicles which are plugged in but not assigned an active session.

Method 400 proceeds to step 406 with decoding the station identifier present in the telematics data using the complementary decoding method to the encoding method used in step 206 of FIG. 2. In some examples, the CMS 106 reads the analog pilot signal or the charging rate value from telematics data and discretizes it to the correct level of granularity. In some examples, the CMS 106 decodes the message in the binary format using the complementary line code and binary decoders.

Method 400 proceeds to step 408 with using the station identifier of the encoded message to find the corresponding charging session if one exists. If no corresponding charging session is found, the CMS 106 determines that there was an error decoding the message. In some examples, the CMS 106 queries a lookup table, database, or other data store to find the charging session that corresponds to that station identifier (e.g., the session table 110 of FIG. 1).

Method 400 proceeds to step 410 with using additional data from the telematics system 102, such as location and plug-in time, to determine a confidence value that the vehicle 108 associated with the telematics data from which the station identifier was obtained matches the charging session associated with a charging station 104. In some examples, the confidence value is a value between 0 and 1. A confidence value may be based on a confidence score for various aspects of the properties of the vehicle 108, the charging station 104, and/or the charging session. One confidence score is $C_d$ (measurement, message), which is the likelihood that the given sequence of measurements is decoded as the final message. For example, if the measurements are noisy, the confidence score $C_d$ is lower. Likewise, if the CMS 106 knows that the message can only take on a limited number of values, then the further the decoded message is from one of those values, the lower the confidence score $C_d$ is. In some examples, the confidence score $C_d$ is dependent on the encoding/decoding scheme. For example, if an analog encoding scheme is used, then the confidence score $C_d$ is a function of the distance between measured value and closest allowable value. In some examples, a Gaussian may be used to assign the confidence score $C_d$. For binary encoded signals, the confidence value $C_d$ may be a function of the signal-to-noise ratio after decoding the message to recover the original signal and/or a function of the number of bit-flips necessary to convert the raw decoded message into the message that was sent.

Another confidence score is $C_{gps}$ (station coordinates, vehicle coordinates), which is the likelihood that the vehicle 108, at its current location, could be plugged into a charging station 104. The confidence score $C_{gps}$ may be calculated using, for example, a Gaussian based on distance between the charging station 104 and the GPS coordinates of the vehicle 108, a multivariate Gaussian centered around the latitude and longitude of the charging station 104, and/or a learned function based the vehicle coordinates measured during previous charging sessions at that station.

Another confidence score is $C_v$ (station, vehicle), which is the likelihood that a vehicle 108 uses a particular charging station 104 based on past data. The confidence score $C_v$ is based on the propensity of a vehicle 108 to frequent a particular charging station 104. For example, the vehicle 108 may have an assigned parking space that includes the charging station 104. In some examples, the confidence score $C_v$ is higher the more frequently a charging session associated with the charging station 104 is assigned to the vehicle 108 in a defined period of time (e.g., 30 days, 60 days, 90 days, etc.). In some examples, the confidence score $C_v$ is based on a percentage of charging sessions associated with a charging station that are assigned to the vehicle 108 in the defined period of time (e.g., 30 days, 60 days, 90 days, etc.). For example, the confidence score $C_v$ may be higher when 80% of the charging sessions assigned to the vehicle 108 are associated with a particular charging station 104.

Another confidence score $C_t$ (station plug in time, vehicle plugin time), which is the likelihood that a vehicle that plugged in at time $t_t$ is responsible for a session which began at time $t_s$. The confidence score $C_t$ may be calculated, for example, using a Gaussian based on the difference $t_s - t_t$ or a learned function based on past data.

The confidence value (C) may be the sum (e.g., $C=C_d+C_{gps}+C_v+C_t$) or the product (e.g., $C=C_d*C_{gps}*C_v*C_t$) of two or more the confidence scores described above.

Method 400 proceeds to step 412, with, when the confidence value satisfies (e.g., exceeds) a threshold confidence value, confirming the match and claiming the charging session for that vehicle 108. Otherwise, when the confidence value does not satisfy the threshold confidence value, the CMS 106 does not claim any session for the vehicle 108. When no charging session is claimed for a vehicle, the CMS 106 may try again at a later time before the plug-in time of the vehicle ages beyond a configurable threshold for consideration. In some examples, because of the challenge of decoding telematics data (e.g., because of noise, because the vehicle 108 may not charge at the maximum allowed rate, etc.), the decoded station identifier may correspond to more than one session. In examples where more than one charging session is identified, the confidence value is used to assign the charging session to a vehicle 108. In some such examples, the location data in the telematics data may be used as an initial filter to only consider vehicles that are likely in the vicinity of the charging station 104 associated with the charging session.

In the above description of method 400, the CMS 106 may decode the station identifier. However, in some examples, the vehicle 108 (e.g., via a telematics control unit, a battery control unit, etc.) or the telematics system 102 may decode the station identifier. For example, when the telematics data from the vehicle 108 includes the pilot signal received from the charging station 104, the telematics system 102 may decode the station identifier.

Note that method 400 is just one example, and other methods including fewer, alternative, or additional steps consistent with this disclosure are possible.

Session Removal Method

Figure 5:
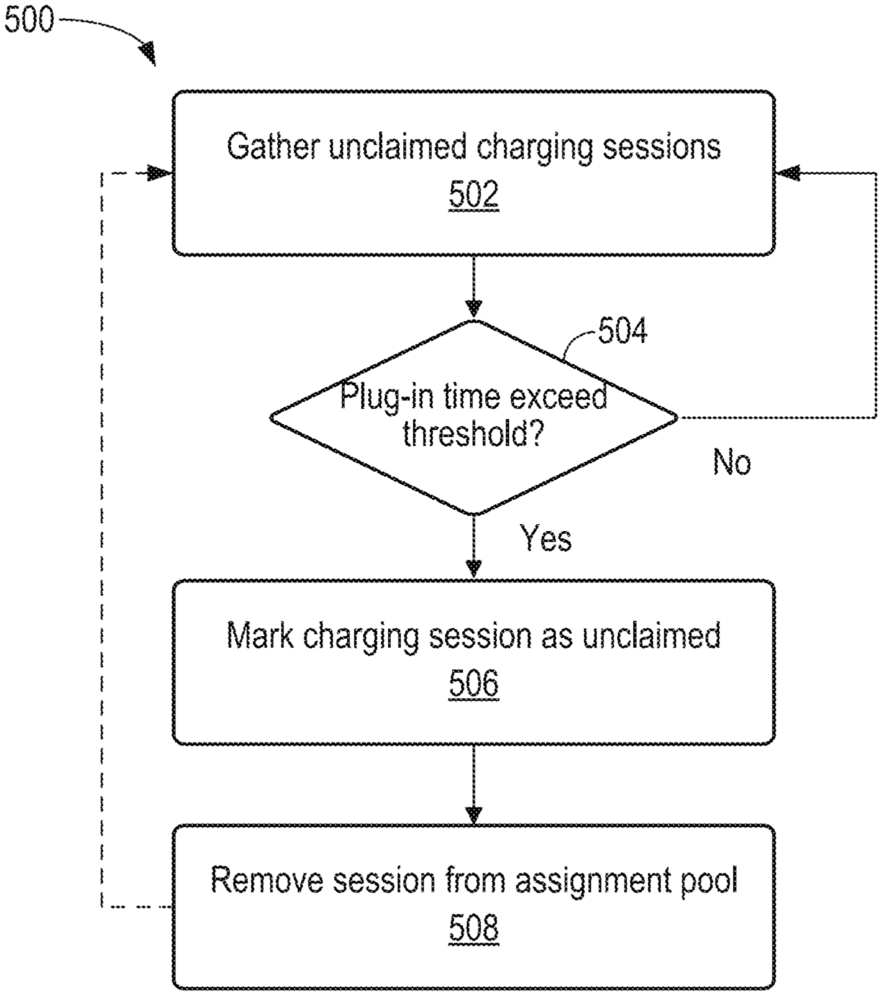
FIG. 5 is a flowchart of an example method to identify sessions that have gone too long without a match as unclaimed and remove them from an assignment pool.

FIG. 5 is a flowchart of an example method 500 to identify sessions that have gone too long without a match as unclaimed and to remove them from the assignment pool. In some examples, method 500 may be performed by a CMS, such as CMS 106 of FIG. 1.

Method 500 starts at step 502 with gathering all unclaimed charging sessions.

Method 500 proceeds to step 504 with determining when the time since the start of the session satisfies (e.g., exceeds) a predefined session threshold (e.g., 5 minutes, 15 minutes, 30 minutes, etc.). As described above, removing charging sessions that are unlikely to be claimed may save network and processing capacity. When the time since the start of the session satisfies the predefined session threshold, the method 500 proceeds to step 506. Otherwise, when the time since the start of the session does not satisfy the predefined session threshold, the method 500 ends.

Method 500 proceeds to step 506 with marking the session as unclaimed.

Method 500 proceeds to step 508 with removing the marked charging session from the pool of possible sessions for assignment.

Note that method 500 is just one example, and other methods including fewer, alternative, or additional steps consistent with this disclosure are possible.

Example Matching Method Using a Static Identifier

Figure 6:
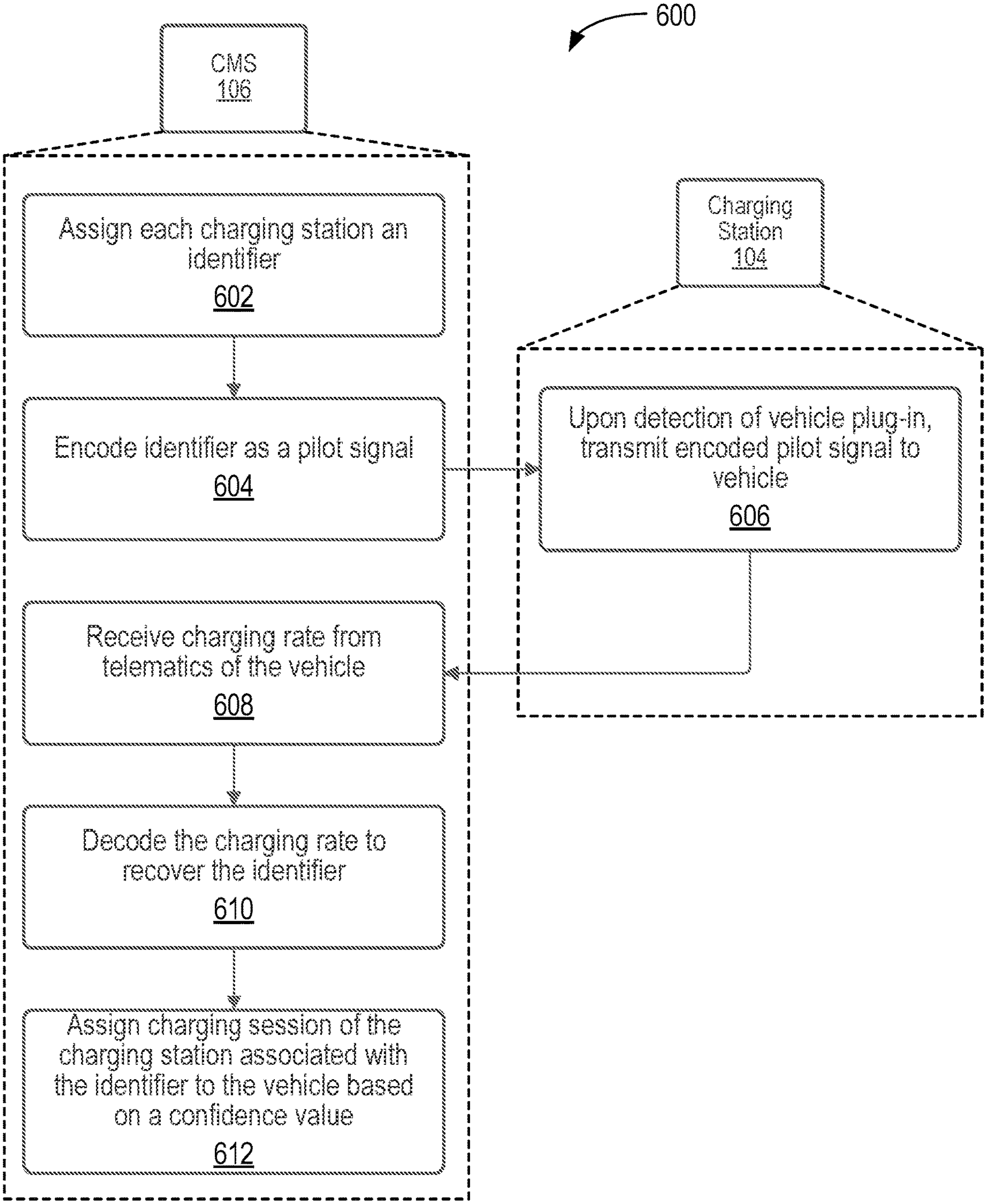
FIGS. 6, 7, 8, and 9 are flowcharts of example methods to encode and decode the station identifier to pair a charging session to a vehicle.

FIG. 6 is a flowchart of an example method 600 to encode and decode the station identifier using a static identifier to match (or associate) a charging session to a vehicle. In some examples, method 600 may be performed by a CMS and a charging station, such as CMS 106 and charging station 104 of FIG. 1.

Method 600 begins at step 602 with assigning each charging station 104 an identifier when a location is provisioned. Each identifier is associated with a particular charging station 104 at the location. In some examples, the identifier is a fixed identifier such that encoding the identifier as a pilot signal causes the maximum current draw of the vehicle 108 to be a constant charge rate (e.g., 8 A, 12 A, 16 A, etc.) for at least a predetermined period of time. In some examples, the identifier is a sequence of values such that encoding the identifier as a sequence of pilot signals causes the maximum current draw of the vehicle 108 to change in a predictable manner (e.g., 8 A to 16 A to 12 A, etc.) for at least a predetermined period of time.

Method 600 proceeds to step 604 with encoding the identifier as a pilot signal (e.g., for a fixed identifier) or a sequence of pilot signals (e.g., for a sequenced identifier).

Method 600 proceeds to step 606 with transmitting the pilot signal(s) to the vehicle 108. Transmitting the pilot signal(s) may be based on or in response to detection of the vehicle 108 plugging into the charging station 104, Method 600 proceeds to step 608 with receiving the charging rate from the telematics data received from the vehicle 108 via the telematics system 102.

Method 600 proceeds to step 610 with decoding the charging rate to recover the identifier. For example, the CMS 106 may detect that the charging rate or the changes of the charging rate of the vehicle 108 corresponds to one of the possible identifiers set at step 502.

Method 600 proceeds to step 612 with assigning a charging session associated with the charging station 104 associated with the identifier recovered at step 610 based on the confidence value of the charging session-vehicle pair satisfying a confidence threshold.

Note that method 600 is just one example, and other methods including fewer, alternative, or additional steps consistent with this disclosure are possible.

Example Matching Method Using a Dynamic Identifier

Figure 7:
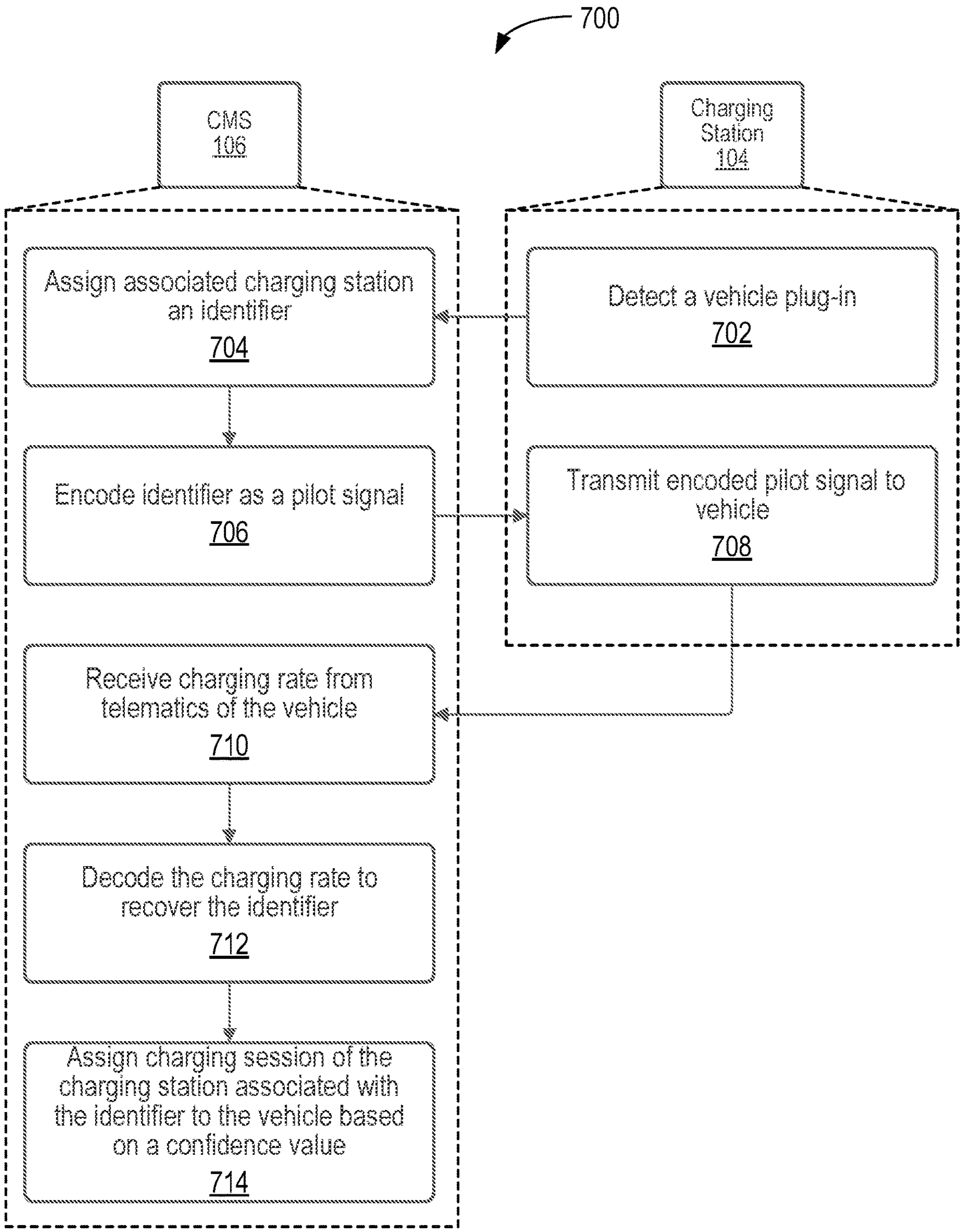

FIG. 7 is a flowchart of an example method 700 to encode and decode the station identifier using a dynamic identifier to pair a charging session to a vehicle. In some examples, method 700 may be performed by a CMS and a charging station, such as CMS 106 and charging station 104 of FIG. 1.

Method 700 begins at step 702 with detecting a vehicle 108 has plugged into the charging station 104.

Method 700 proceeds to step 704 with assigning the charging station 104 a fixed or sequence identifier. In some examples, the identifier may be selected from a set of predefined identifiers. In some examples, the assigned identifier is not reused until (i) the charging session is assigned to a vehicle 108, (ii) the claim period ends for the charging session, or (iii) there are not unassigned identifiers in the set of predefined identifiers.

Method 700 proceeds to step 706 with encoding the identifier as a pilot signal (e.g., for a fixed identifier) or a sequence of pilot signals (e.g., for a sequenced identifier).

Method 700 proceeds to step 708 with the charging station 104 transmitting the pilot signal(s) to the vehicle 108.

Method 700 proceeds to step 710 with receiving the charging rate from the telematics data received from the vehicle 108 via the telematics system 102.

Method 700 proceeds to step 712, with decoding the charging rate to recover the station identifier. For example, the CMS 106 may detect that the charging rate or the changes of the charging rate of the vehicle 108 corresponds to one of the possible station identifiers that have been assigned to the charging stations with unclaimed charging sessions.

Method 700 proceeds to step 714 with assigning a charging session associated with the charging station 104 associated with the station identifier recovered at step 712 based on the confidence value of the charging session-vehicle pair satisfying a confidence threshold.

Note that method 700 is just one example, and other methods including fewer, alternative, or additional steps consistent with this disclosure are possible.

Example Matching Method Using a Fixed Digital Identifier

Figure 8:
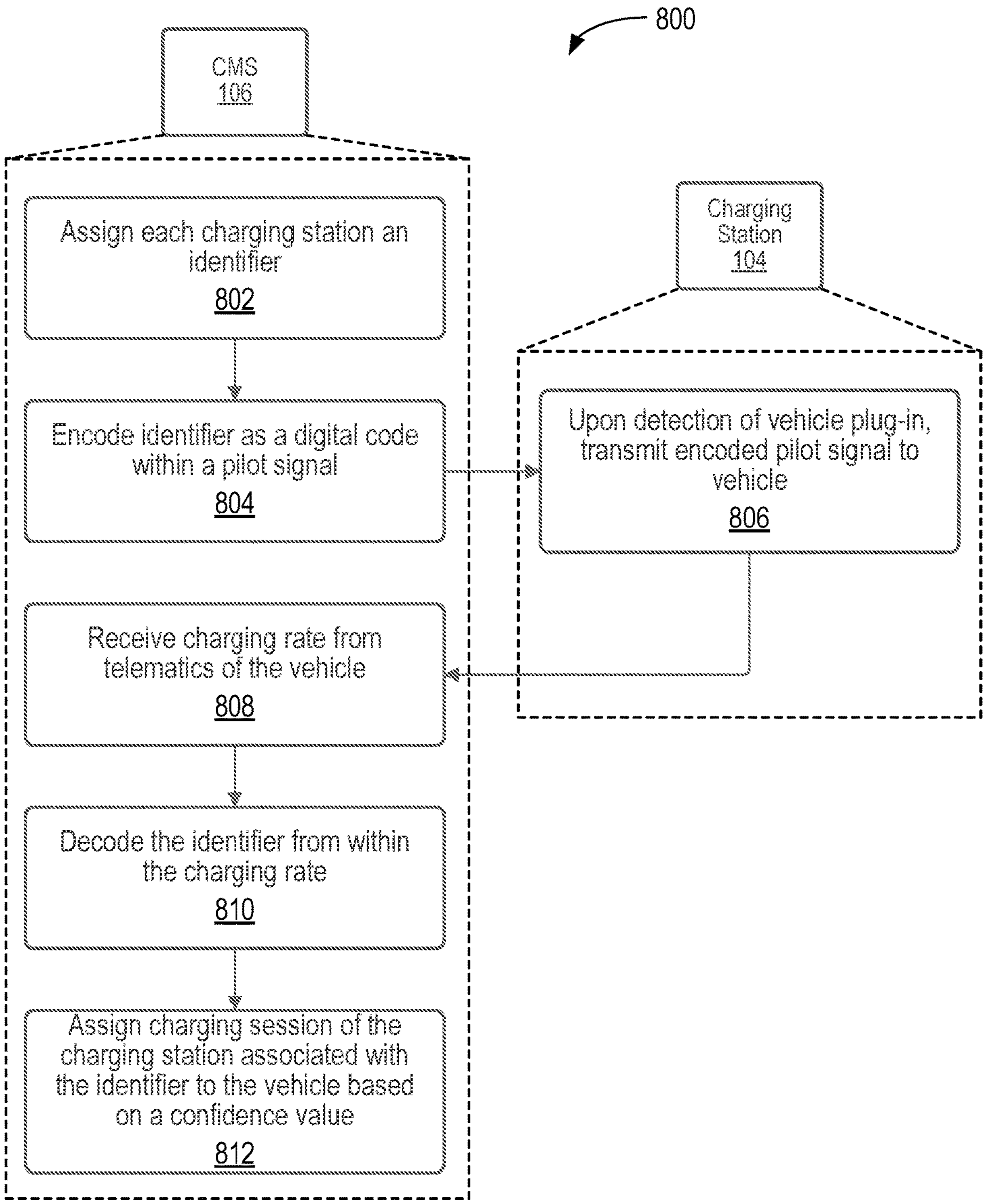

FIG. 8 is a flowchart of an example method 800 to encode and decode the station identifier using a sequence-based identifier to pair a charging session to a vehicle. In some examples, method 800 may be performed by a CMS and a charging station, such as CMS 106 and charging station 104 of FIG. 1.

Method 800 begins at step 802 with assigning each charging station 104 an identifier when a location is provisioned. Each identifier is associated with a particular charging station 104 at the location. The identifier may be a binary value or a human-readable value that can be converted into a binary value. For example, the identifier may be "CHIL002S04." The identifier may be a full station identifier, such as no additional information is needed to identify the station, or it could be a simplified station identifier such as the identifier which is only unique within a geographic region.

Method 800 proceeds to step 804 with encoding the station identifier as a pilot signal. In the illustrated example, the station identifier value may be encoded in a digital format. For example, the string "s03" may be encoded as "010100110011000000110011." To encode the digital or binary formatted station identifier to an ordered set of pilot signals defined by duty cycles, an encoding scheme is used. In some examples, the encoding scheme is a line coding scheme for transmitting the identifier via the pilot signal, such as a return-to-zero (RZ) algorithm, non-return-to-zero (NRZ) algorithm, or a Manchester algorithm.

Because of the technical limitations of using the pilot signal to supply the station identifier to the vehicle 108 to be recovered from the telematics data of the vehicle 108, selection of an encoding scheme has several considerations. In some examples, because there is no direct communication between the charging station 104 and the vehicle 108, the encoding scheme does not rely on an external clock. In some examples, because rapid fluctuations in the pilot signal may be ignored by the vehicle 108 and the obtainable bitrate is low, the encoding scheme minimizes bit transitions. In some examples, because the pilot signal is generally not available via the telematics data and the station identifier is decoded from the actual charging current (which may be noisy and potentially clipped), the encoding scheme uses easily distinguishable levels or transitions. For example, the maximum draw current defined as a 1 and the maximum draw current defined as a 0 may be at least 4 A apart. In some examples, because vehicles may be slow to respond to changes in the pilot signal (e.g., increases in the pilot signal), the encoding scheme uses a pilot signal that specifies a higher maximum current draw as the baseline, and then modulates the maximum current draw down.

Method 800 proceeds to step 806 with transmitting the pilot signal to the vehicle 108. In some examples, transmitting the pilot signal is based upon detection of the vehicle 108 plugging into the charging station 104.

Method 800 proceeds to step 808 with receiving the charging rate of the vehicle 108 from the telematics data received from the vehicle 108 via the telematics system 102.

Method 800 proceeds to step 810, with the CMS 106 decoding the charging rate to recover the identifier based on the encoding scheme used at step 704.

Method 800 proceeds to step 812, with the CMS 106 assigning a charging session associated with the charging station 104 associated with the identifier recovered at step 810 based on a confidence value of the charging session-vehicle pair satisfying a confidence threshold.

Note that method 800 is just one example, and other methods including fewer, alternative, or additional steps consistent with this disclosure are possible.

Example Matching Method Using a Dynamic Digital Identifier

Figure 9:
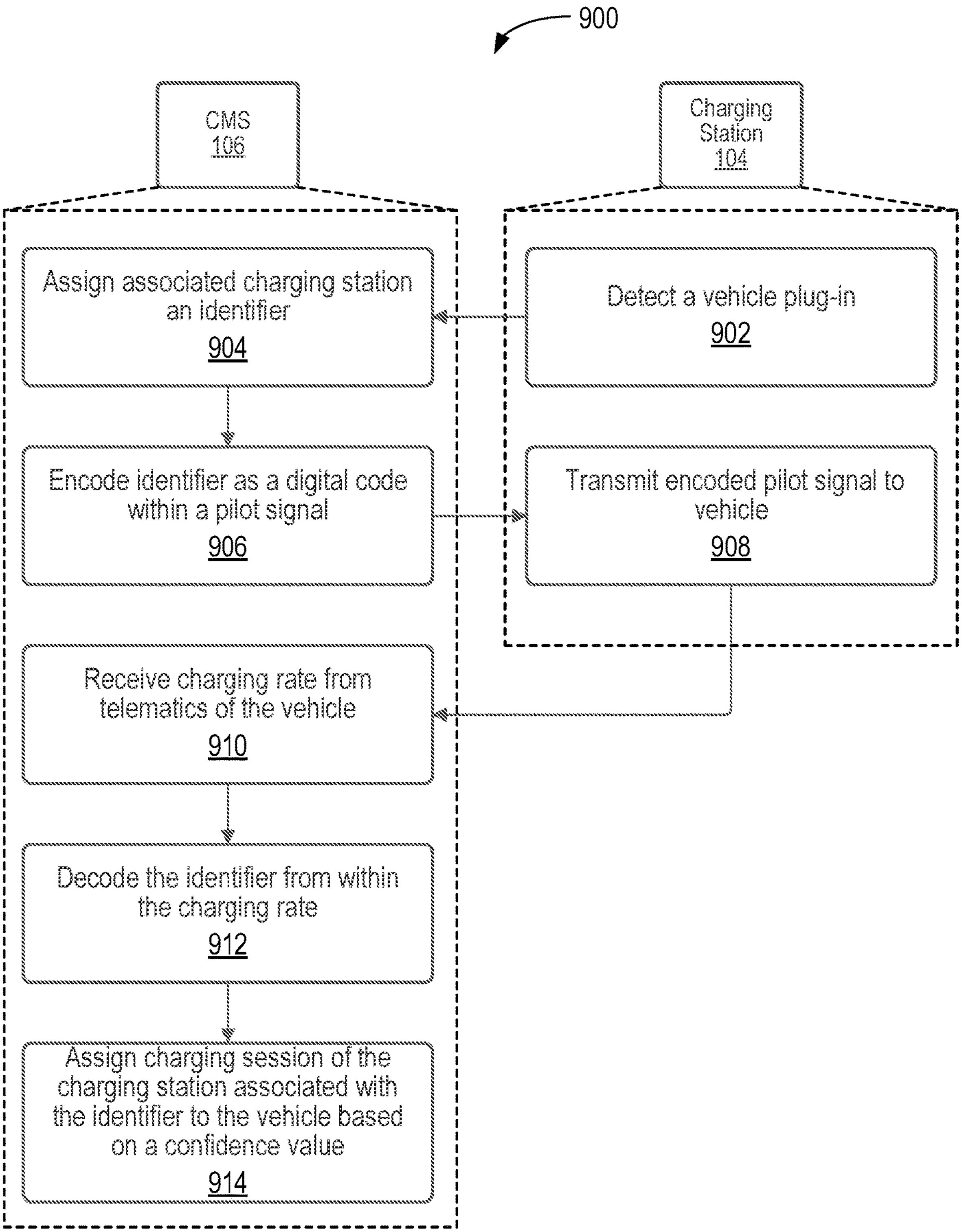

FIG. 9 is a flowchart of an example method 900 to encode and decode the station identifier using a digital-based identifier to pair a charging session to a vehicle. In some examples, method 900 may be performed by a CMS and a charging station, such as CMS 106 and charging station 104 of FIG. 1.

Method 900 begins at step 902 with detecting a vehicle 108 has plugged into the charging station 104.

Method 900 proceeds to step 904 with assigning the charging station 104 a station identifier. The identifier is a binary value. In some examples, the identifier is selected from a set of values specific to a location and/or a period of time. For example, the identifier may be selected from a set for a specific parking lot installation of charging stations 104 and a subset within that set specific to a six (6)-hour block of time. In such an example, if there are five charging stations at a location and it is a second 6-hour block, the identifier may be selected from a set comprising 6, 7, 8, 9, and 10. In such a manner, location data and plug-in time may be used to determine the possible identifiers and to minimize the amount of data sent via the pilot signal.

Method 900 proceeds to step 906 with encoding the identifier as a pilot signal (e.g., for a fixed identifier) or a sequence of pilot signals (e.g., for a sequenced identifier).

Method 900 proceeds to step 908 with transmitting the pilot signal(s) to the vehicle 108. In some examples, the pilot signal(s) may be transmitted upon detection of the vehicle 108 plugging into the charging station 104.

Method 900 proceeds to step 910, with the CMS 106 receiving the charging rate from the telematics data received from the vehicle 108 via the telematics system 102.

Method 900 proceeds to step 912, with the CMS 106 decoding the charging rate to recover the identifier based on the encoding scheme used at step 906.

Method 900 proceeds to step 914, with the CMS 106 assigning a charging session associated with the charging station 104 associated with the identifier recovered at step 912 based on a confidence value of the charging session-vehicle pair satisfying a confidence threshold.

Encoding and Decoding a Charging Profile

Figure 10:
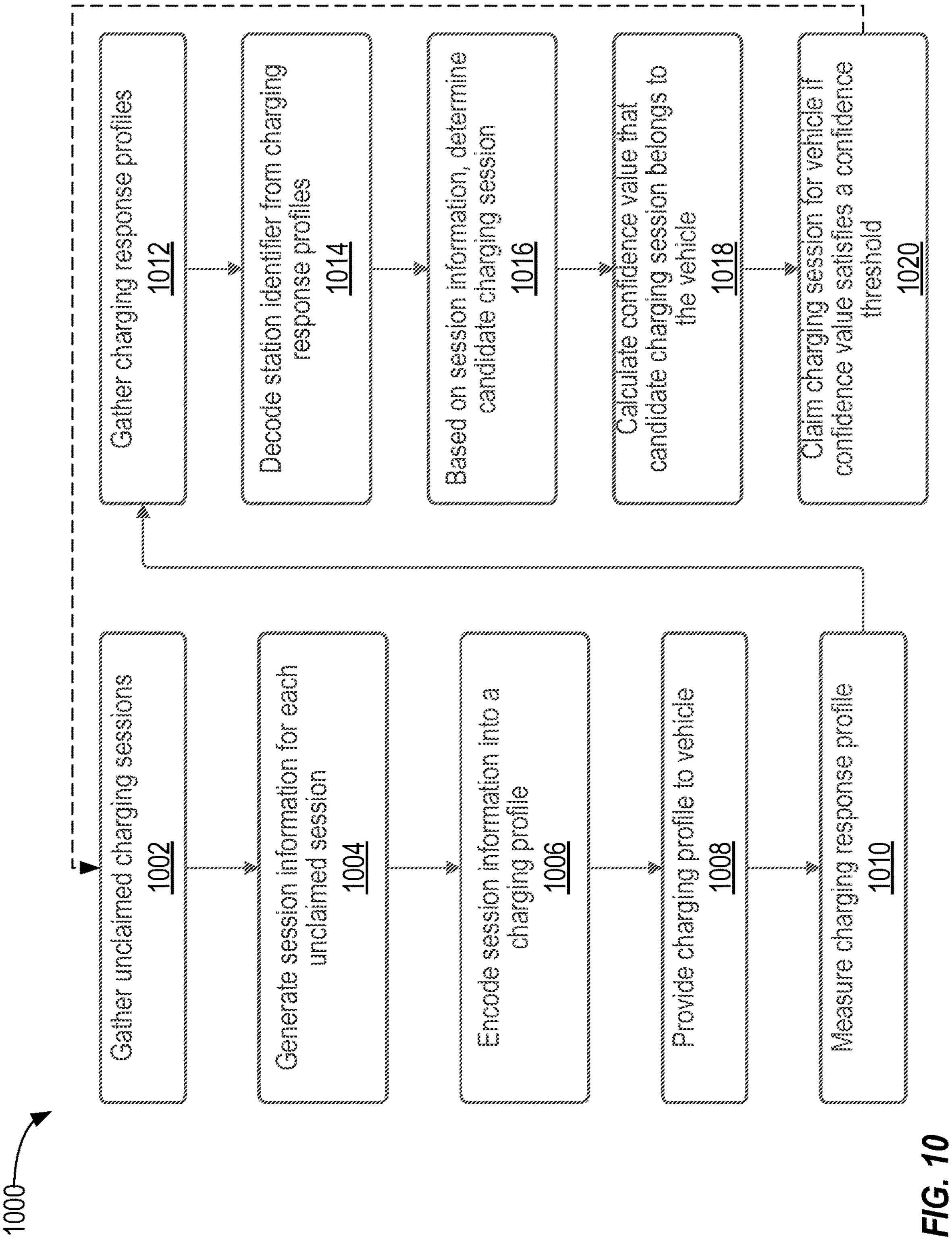
FIG. 10 is a flowchart of an example method to provide the station identifier to a vehicle.

FIG. 10 is a flowchart of an example method 1000 to provide the station identifier to the vehicle 108. In some examples, method 1000 be performed by a CMS and a charging station, such as CMS 106 and charging station 104 of FIG. 1. The method of 1000 may be used, for example, when the CMS 106 and the vehicle 108 have a communication channel separate from the charging station 104 or when the CMS 106 and the vehicle 108 are directly or indirectly communicatively coupled. In some examples, the vehicle 108 may be communicatively coupled to the CMS 106 over a cellular data connection via an application operating on a processing unit, telematics unit, or infotainment unit of the vehicle 108. In some examples, the telematics system 102 may serve as a communication intermediary between the vehicle 108 and the CMS 106. In some examples, the CMS 106 and the vehicle 108 are communicatively coupled via a wireless local area network, a personal area network, or other wireless communication channel.

The vehicle 108 may signal, though the communication channel, when it has been plugged into the charging station 104.

Method 1000 begins at step 1002 with gathering information related to the vehicles 108 that are actively charging, do not have charging session associated with them, and are eligible to automatic session claims. An example of determining eligibility for automatic session claiming is discussed in connection with FIG. 5 above.

Method 1000 proceeds to step 1004 with determining the station identifier to send to the actively charging vehicle 108. For example, the CMS 106 may define a set of potential station identifiers to select from. In some examples, the CMS 106 uses a dynamic local identifier which is determined by enumerating the unclaimed active sessions at the location. For example, if there are five active unclaimed sessions, the CMS 106 may use the values of 0, 1, 2, 3, and 4. In some examples, the CMS 106 uses a dynamic global identifier that is determined by enumerating the global unclaimed active sessions. For example, if there are 500 active unclaimed sessions globally, the CMS 106 may use identifiers 0, 1, 2, . . . , 499.

Method 1000 proceeds to step 1006 with encoding the station identifier into a charging profile. The charging profile includes instructions to cause the vehicle 108 to perform a sequence of one or more changes to the charging rate, and as a result the rate of current draw, of the vehicle 108. The station identifier may be encoded as an analog signal (e.g., a specified charging rate or set of specified charting rates) or as a digital signal (e.g., using NRZ encoding with two or four levels, Manchester encoding, differential encoding, etc.).

Method 1000 proceeds to step 1008 with providing the charging profile to the vehicle 108 to cause the vehicle 108 to implement the charging profile. For example, the charging profile may cause the vehicle 108 to implement a charging rate as corresponding to plot 310 of FIG. 3.

The method proceeds to step 1010 with measuring the current draw of the vehicle 108 indicative of the charging rate (sometimes referred to as a "charging response profile") by the charging station 104 and providing the charging response profile to, for example, the CMS 106 to recover the station identifier from the charging response profile. In some examples, the charging station 104 communicates the charging response profile via a charging station network using, for example, the Open Charge Point Protocol (OCPP).

The method proceeds to step 1012 with gathering the charging response profiles from charging stations 104 that are associated with unclaimed charging sessions.

The method proceeds to step 1014 with decoding the station identifier present in the charging response profiles using the complementary decoding method to the encoding method used in step 1006.

Method 1000 proceeds to step 1016 with using the station identifiers to find the corresponding charging sessions if they exist. If no corresponding charging session is found, the CMS 106 determines that there was an error decoding the message. In some examples, the CMS 106 queries a lookup table, database, or other data store to find the charging session that corresponds to that station identifier (e.g., the session table 110 of FIG. 1).

Method 1000 proceeds to step 1018 with using additional data from the telematics system 102, such as location and plug-in time, to determine a confidence value that the vehicle 108 associated with the telematics data, where the station identifier obtained from the telematics data matches the charging session associated with a charging station 104.

Method 1000 proceeds to step 1020, with, when the confidence value satisfies (e.g., exceeds) a threshold confidence value, confirming the match and claiming the charging session for that vehicle 108. Otherwise, when the confidence value does not satisfy the threshold confidence value, the CMS 106 does not claim any session for the vehicle 108. When no charging session is claimed for a vehicle, the CMS 106 may try again at a later time before the plug-in time of the vehicle ages beyond a configurable threshold for consideration.

Note that method 1000 is just one example, and other methods including fewer, alternative, or additional steps consistent with this disclosure are possible.

Vehicle Determined Message

Figure 11:
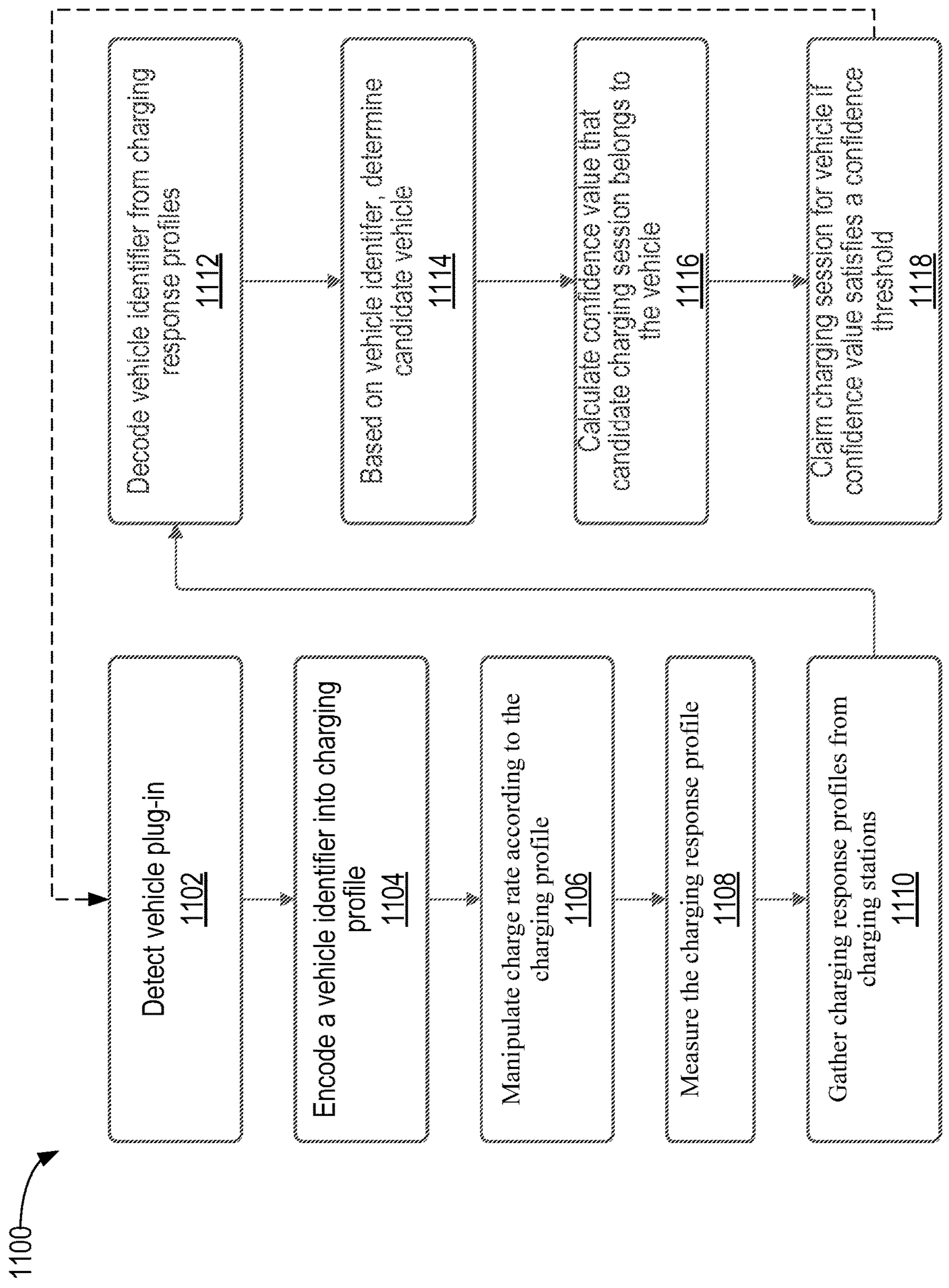
FIG. 11 is a flowchart of an example method to claim a charging session when the vehicle has a fixed identifier.

FIG. 11 is a flowchart of an example method 1100 to provide a vehicle identifier to the vehicle 108. In some examples, method 1100 may be performed by a CMS and a charging station, such as CMS 106 and charging station 104 of FIG. 1.

Method 1100 begins at step 1102 when the vehicle 108 plugs into one of the charging stations 104.

Method 1100 proceeds to step 1104 with encoding a vehicle identifier into charging profile. The vehicle identifier may be a value or a set of values that facilitates identifying the vehicle 108. In some examples, the vehicle identifier may be an identification number assigned to the vehicle 108 when the vehicle 108 is configured to use charging stations 104 managed by the CMS 106, an identification number assigned by the telematics system 102, or a license plate number, etc. In some examples, the vehicle identifier may be algorithmically determined (e.g., via a hash algorithm, etc.) based on the state of the vehicle 108 (e.g., state of charge, GPS coordinates, plug-in time, etc.) when the vehicle 108 is plugged into the charging station 104. In some such examples, the state of the vehicle 108 used to generate the vehicle identifier is ascertainable by the CMS 106 via the telematics data received from the telematics system. In some examples, the state of the vehicle 108 (e.g. state of charge, battery capacity, estimated departure time, etc.) is encoded along with vehicle identifier to be used by the CMS 106 to make charging decisions.

Method 1100 proceeds to step 1106 with the vehicle 108 manipulating its charge rate according to the charging profile.

Method 1100 proceeds to step 1108 with measuring the charging response profile of the vehicle 108 by the charging station 104 and providing the charging response profile to, for example, the CMS 106 to recover the vehicle identifier from the charging response profile.

Method 1100 proceeds to step 1110 with gathering the charging response profiles from charging stations 104 that are associated with unclaimed charging sessions.

Method 1100 proceeds to step 1112 with decoding the vehicle identifier present in the charging response profiles using the complementary decoding method to the encoding method used in step 1104.

Method 1100 proceeds to step 1114 with using the vehicle identifiers to find the corresponding vehicle if they exist. If no corresponding vehicle is found, it is determined that there was an error decoding the message. In some examples, the CMS 106 queries a lookup table, database, or other data store to find the vehicle that corresponds to that vehicle identifier.

Method 1100 proceeds to step 1116 with using additional data from the telematics system 102, such as location and plug-in time, to determine a confidence value that the charging session at the charging station 104 associated with the charging measurements from which the vehicle identifier was obtained belongs to the vehicle 108 associated with that identifier.

Method 1100 proceeds to step 1118, with, when the confidence value satisfies (e.g., exceeds) a threshold confidence value, confirming the match and claiming the charging session for that vehicle 108. Otherwise, when the confidence value does not satisfy the threshold confidence value, no session is claimed for the vehicle 108. In some examples, when no charging session is claimed for a vehicle, the CMS 106 may try again at a later time before the plug-in time of the vehicle ages beyond a configurable threshold for consideration.

Note that method 1100 is just one example, and other methods including fewer, alternative, or additional steps consistent with this disclosure are possible.

Example Processing Device(s)

Figure 12:
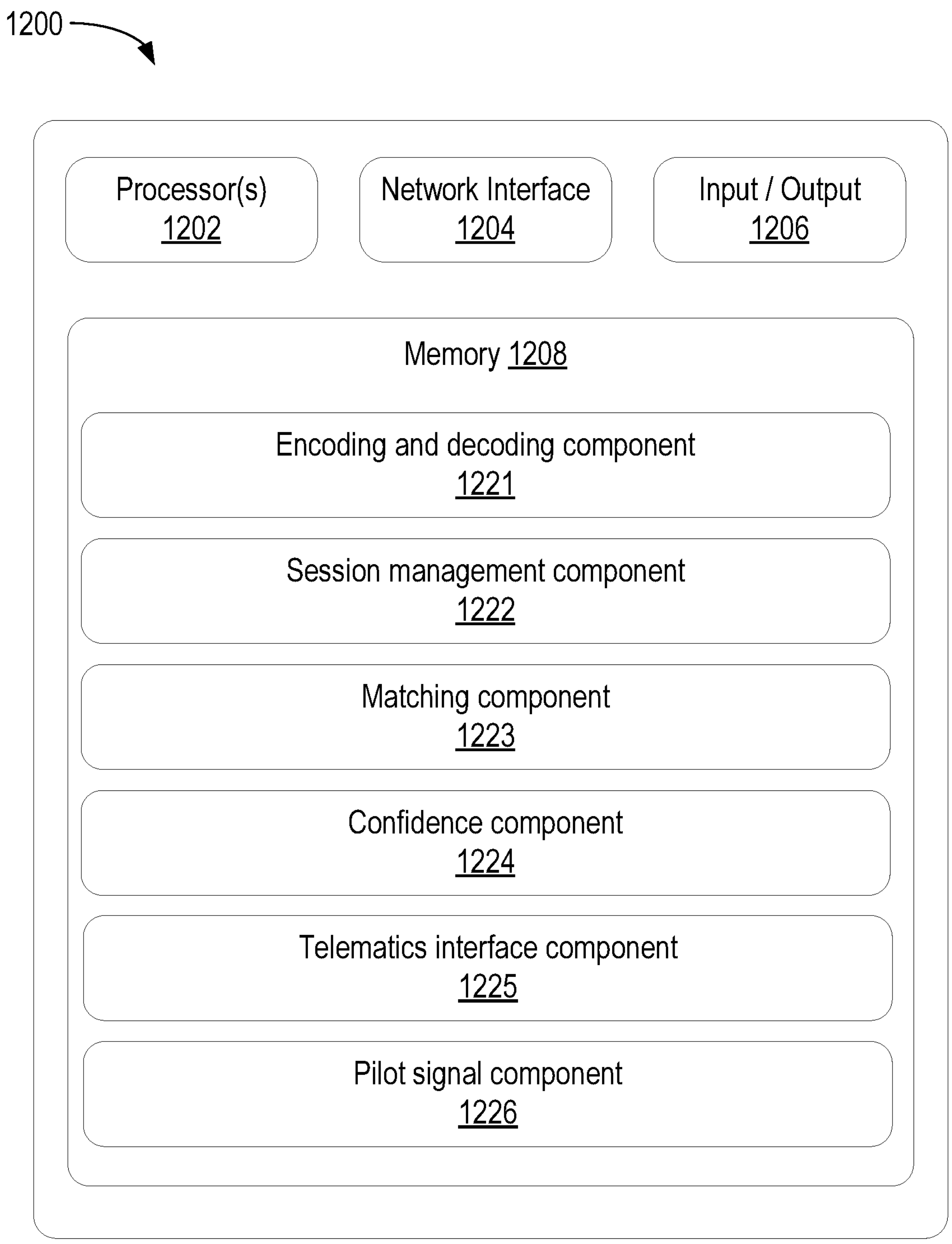
FIG. 12 depicts an example processing system of a charging management system configured to perform the methods described herein.

FIG. 12 depicts an example processing system 1200 configured to perform the methods described herein.

Processing system 1200 includes one or more processors 1202. Generally, a processor 1202 is configured to execute computer-executable instructions (e.g., software code) to perform various functions, as described herein. The processor(s) 1202 may be any suitable processing device or set of processing devices such as, but not limited to: a microprocessor, a microcontroller-based platform, a suitable integrated circuit, one or more FPGAs, and/or one or more ASICs.

Processing system 1200 further includes a network interface 1204, which generally provides data access to any sort of data network, including local area networks (LANs), wide area networks (WANs), mesh networks, wireless personal area networks, the Internet, and the like.

Processing system 1200 further includes input(s) and output(s) 1206, which generally provide means for providing data to and from processing system 1200, such as via connection to computing device peripherals, including user interface peripherals.

Processing system 1200 further includes a memory 1208 comprising various components. The memory 1208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 1208 includes multiple kinds of memory, particularly volatile memory and non-volatile memory. In this example, memory 1208 includes an encoding and decoding component 1221 to encode the station identifier into a sequence of one or more pilot signals and decode the station identifier from telematics data as described herein. The memory 1208 also includes a session management component 1222 to track charging sessions and maintain the session table 110 as described herein. The memory 1208 also includes a matching component 1223 to pair charging sessions with users associated with vehicle 108 that use the charging stations 104 as described herein. The memory 1208 also includes a confidence component 1224 to calculate confidence levels as described herein. The memory 1208 also includes a telematics interface component 1225 that communicates with the telematics system 102 as described herein. The memory 1208 also includes a pilot signal component 1226 to generate pilot signals for the charging stations 104 as described herein.

Processing system 1200 may be implemented in various ways. For example, processing system may be implemented within a CMS 106. However, in other implementations, aspects of processing system 1200 may be distributed, such as between charging stations 104, the CMS 106, edge network processors, and other processing equipment, including on-site, remote, or cloud-based processing equipment. Note that in various implementations, certain aspects may be omitted from processing system 1200.

Figure 13:
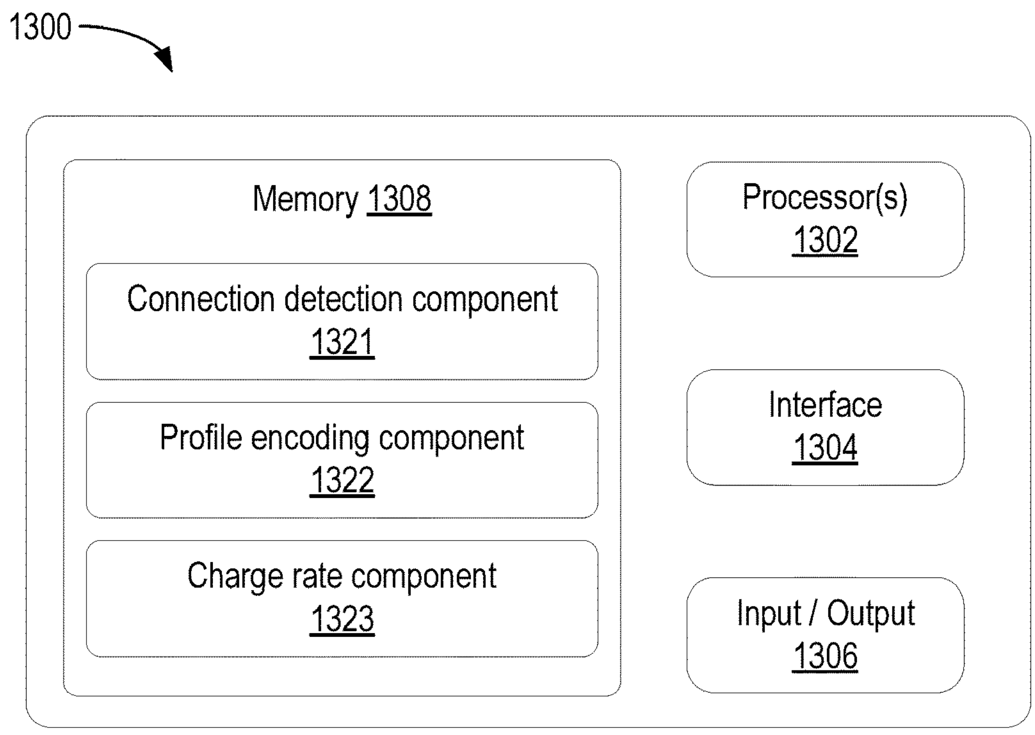
FIG. 13 depicts an example processing system of a vehicle configured to perform the methods described herein.

FIG. 13 depicts an example processing system 1300 configured to perform the methods described herein. The processing system 1300 may be, for example, an electronic control unit (ECU) of the vehicle 108, such as a battery control unity, a vehicle control unit, a telematics control unit, or an on-board computing platform, etc.

Processing system 1300 includes one or more processors 1302. Generally, a processor 1302 is configured to execute computer-executable instructions (e.g., software code) to perform various functions, as described herein. The processor(s) 1302 may be any suitable processing device or set of processing devices such as, but not limited to: a microprocessor, a microcontroller-based platform, a suitable integrated circuit, one or more FPGAs, and/or one or more ASICs.

Processing system 1300 further includes a network interface 1304, which generally provides data access to any sort of data network, including local area networks (LANs), wide area networks (WANs), wireless personal area networks, and the like.

Processing system 1300 further includes input(s) and output(s) 1306, which generally provide means for providing data to and from processing system 1300, such as via connection to computing device peripherals, including user interface peripherals.

Processing system 1300 further includes a memory 1308 comprising various components. The memory 1308 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 1308 includes multiple kinds of memory, particularly volatile memory and non-volatile memory. In this example, memory 1308 includes a connection detection component 1321 to detect when the vehicle 108 is plugged into the charging station 104. The memory 1308 also includes a profile encoding component 1322 to encode a vehicle identifier into a charging profile as described herein. The memory 1308 also includes a charge rate component 1323 to manipulate the charge rate that vehicle 108 draws from the charging stations 104 as described herein.

Figure 14:
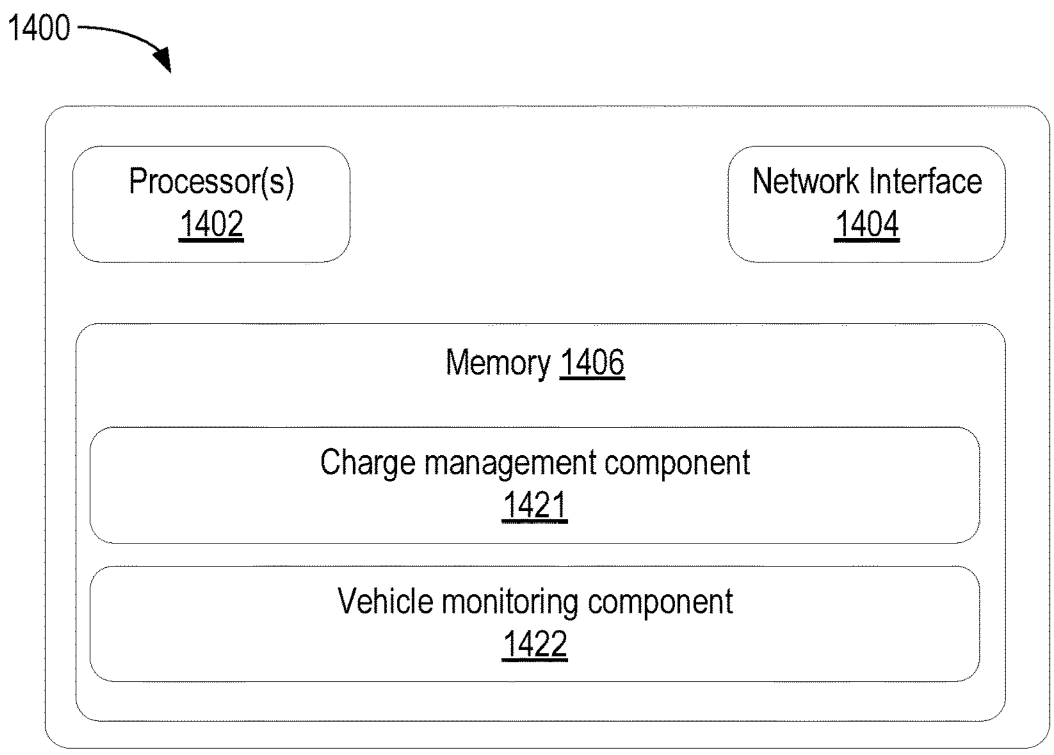
FIG. 14 depicts an example processing system of a charging station configured to perform the methods described herein.

FIG. 14 depicts an example processing system 1400 configured to perform the methods described herein. The processing system 1400 may, for example, be incorporated into the charging station 104.

Processing system 1400 includes one or more processors 1402. Generally, a processor 1402 is configured to execute computer-executable instructions (e.g., software code) to perform various functions, as described herein. The processor(s) 1402 may be any suitable processing device or set of processing devices such as, but not limited to: a microprocessor, a microcontroller-based platform, a suitable integrated circuit, one or more FPGAs, and/or one or more ASICs.

Processing system 1400 further includes a network interface 1404, which generally provides data access to any sort of data network, including local area networks (LANs), wide area networks (WANs), mesh networks, wireless personal area networks, the Internet, and the like. For the example, the network interface 1404 may couple to the CMS 106.

Processing system 1400 further includes a memory 1406 comprising various components. The memory 1406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 1406 includes multiple kinds of memory, particularly volatile memory and non-volatile memory. In this example, memory 1406 includes an a charge management component 1421 to provide the encoded identifier message to the vehicle plugged into the charging station as a sequence of one or more pilot signals as described herein. The memory 1406 also includes a vehicle monitoring component 1422 to measure charging characteristics of the vehicle 108 plugged in to the charging station 104 as described herein, such as a rate of current draw by the vehicle 108.

Example Clauses

Implementation examples are described in the following numbered clauses:

Clause 1: A method for charging management of a vehicle, the method comprising: detecting a charge session associated with a charging station; generating an encoded identification message that includes an identifier, sending the encoded identification message to the charging station, the encoded identification message configured to cause the vehicle connected to the charging station to alter a battery charging rate based on the identifier; receiving telematics data from the vehicle, the telematics data including the battery charging rate; decoding the identifier from the battery charging rate; and assigning the charge session to an account associated with the vehicle based on the decoded identifier.

Clause 2: The method of Clause 1, wherein the encoded identification message comprises a pilot signal that is configured to cause the vehicle to alter the battery charging rate to a specific battery charging rate based on the identifier.

Claim 3: The method of Clause 1, wherein the encoded identification message comprises a sequence of pilot signals that are configured to cause the vehicle to alter the battery charging rate to a sequence of specific battery charging rates based on the identifier.

Claim 4: The method of any of Clauses 1-3, wherein the identifier is associated with the charging station.

Clause 5: The method of any of Clauses 1-4, further comprising associating the identifier with the charging station in response to detecting the charge session associated with the charging station.

Clause 6: The method of any of Clauses 1 and 3-5, wherein generating the encoded identification message further comprises encoding a binary value of the identifier as a sequence of pilot signals using a line coding technique.

Clause 7: The method of Clause 6, wherein the line coding technique is selected from a group consisting of bilevel non-return-to-zero (NRZ) encoding, quadlevel NRZ encoding, Manchester encoding, and differential encoding.

Clause 8: The method of any of Clauses 1-7, further comprising: generating a confidence value based on the telematics data received from the vehicle; and assigning the charge session to when the account associated with the vehicle based on the decoded identifier when the confidence value satisfies a confidence threshold.

Clause 9: The method of Clause 8, wherein the confidence value is based on coordinates of the vehicle included in the telematics data.

Clause 10: The method of Clause 8, wherein the confidence value is based at least in part on a plug-in time of the vehicle included in the telematics data.

Clause 11: The method of any of Clauses 1-10, wherein detecting the charge session and assigning the charge session to the account associated with the vehicle are performed without direct user intervention after the vehicle is plugged into the charging station.

Clause 12: A method for electric vehicle charging management, the method comprising: generating an encoded identification message that includes an identifier; in response to detecting a vehicle plugging into a charging station, manipulating an operation of the vehicle based on the encoded identification message; and providing operation data from the vehicle, the operation data including indicia resulting from manipulating the operation of the vehicle based on the encoded identification message; wherein the identifier is decoded from the indicia, and a charge session is assigned to an account associated with the vehicle based on the decoded identifier.

Clause 13: The method of Clause 12, wherein the operation data is telematics data recorded by a telematics system of the vehicle.

Clause 14: The method of Clause 13, wherein the indicia is a battery recharge rate manipulated based on the encoded identification message.

Clause 15: The method of Clause 13, wherein the indicia is a measurement of a pilot signal received from the charging station included in the telematics data.

Clause 16: The method of any of Clauses 12-15, wherein the operation data is measured by the charging station.

Clause 17: The method of any of Clauses 12-16, wherein the indicia is a rate of current draw measured by the charging station, the rate of current draw manipulated based on the encoded identification message.

Clause 18: The method of any of Clauses 12-17, wherein generating the encoded identification message further comprises encoding a binary value of the identifier as a sequence of instructions using a line coding technique configured to cause the vehicle to change a battery recharge rate.

Clause 19: The method of Clause 18, wherein the line coding technique is selected from a group consisting of bilevel non-return-to-zero (NRZ) encoding, quadlevel NRZ encoding, Manchester encoding, and differential encoding.

Clause 20: The method of any of Clauses 12-19, wherein the identifier is a fixed identifier associated with the account or vehicle.

Clause 21: The method of any of Clauses 12-20, wherein the identifier is based on operational conditions of the vehicle when the vehicle is plugged into the charging station.

Clause 22: A charge management system comprising: at least one processor; and memory comprising instructions that, when executed, cause the at least one processor to: detect a charge session associated with a charging station communicatively coupled to the charge management system; generate an encoded identification message that includes an identifier; send the encoded identification message to the charging station, the encoded identification message configured to cause a vehicle connected to the charging station to alter a battery charging rate based on the identifier; receive telematics data from the vehicle, the telematics data including the battery charging rate; decode the identifier from the battery charging rate; and assign the charge session to an account associated with the vehicle based on the decoded identifier.

Clause 23: An electronic control unit of a vehicle comprising: at least one processor; and memory comprising instructions that, when executed, cause the at least one processor to: generate an encoded identification message that includes an identifier; in response to detecting the vehicle plugging into a charging station, manipulate a battery recharge rate of the vehicle based on the encoded identification message; and provide the battery recharge rate to a charge management system; wherein the identifier is decoded from the battery recharge rate, and a charge session is assigned to an account associated with the vehicle based on the decoded identifier.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for charging management of a vehicle, the method comprising:

detecting a charge session associated with a charging station;

generating an encoded identification message that includes an identifier;

sending the encoded identification message to the charging station, the encoded identification message configured to cause the vehicle connected to the charging station to alter a battery charging rate based on the identifier;

receiving telematics data from the vehicle, the telematics data including the battery charging rate;

decoding the identifier from the battery charging rate; and assigning the charge session to an account associated with the vehicle based on the decoded identifier.

2. The method of claim 1, wherein the encoded identification message comprises at least one of: a pilot signal that is configured to cause the vehicle to alter the battery charging rate to a specific battery charging rate based on the identifier or a sequence of pilot signals that are configured to cause the vehicle to alter the battery charging rate to a sequence of specific battery charging rates based on the identifier.

3. The method of claim 1, wherein the identifier is associated with the charging station.

4. The method of claim 1, further comprising associating the identifier with the charging station in response to detecting the charge session associated with the charging station.

5. The method of claim 1, wherein generating the encoded identification message further comprises encoding a binary value of the identifier as a sequence of pilot signals using a line coding technique.

6. The method of claim 5, wherein the line coding technique is selected from a group consisting of bilevel non-return-to-zero (NRZ) encoding, quadlevel NRZ encoding, Manchester encoding, and differential encoding.

7. The method of claim 1, further comprising:

generating a confidence value based on the telematics data received from the vehicle; and assigning the charge session to when the account associated with the vehicle based on the decoded identifier when the confidence value satisfies a confidence threshold.

8. The method of claim 7, wherein the confidence value is based on at least one of: coordinates of the vehicle included in the telematics data or at least in part on a plug-in time of the vehicle included in the telematics data.

9. The method of claim 1, wherein detecting the charge session and assigning the charge session to the account associated with the vehicle are performed without direct user intervention after the vehicle is plugged into the charging station.

10. A method for electric vehicle charging management, the method comprising:

generating an encoded identification message that includes an identifier;

in response to detecting a vehicle plugging into a charging station, manipulating an operation of the vehicle based on the encoded identification message; and providing operation data from the vehicle, the operation data including indicia resulting from manipulating the operation of the vehicle based on the encoded identification message, wherein the identifier is decoded from the indicia, and a charge session is assigned to an account associated with the vehicle based on the decoded identifier.

11. The method of claim 10, wherein the operation data is telematics data recorded by a telematics system of the vehicle.

12. The method of claim 11, wherein the indicia is at least one of: a battery recharge rate manipulated based on the encoded identification message or a measurement of a pilot signal received from the charging station included in the telematics data.

13. The method of claim 10, wherein the operation data is measured by the charging station.

14. The method of claim 10, wherein the indicia is a rate of current draw measured by the charging station, the rate of current draw manipulated based on the encoded identification message.

15. The method of claim 10, wherein generating the encoded identification message further comprises encoding a binary value of the identifier as a sequence of instructions using a line coding technique configured to cause the vehicle to change a battery recharge rate.

16. The method of claim 15, wherein the line coding technique is selected from a group consisting of bilevel non-return-to-zero (NRZ) encoding, quadlevel NRZ encoding, Manchester encoding, and differential encoding.

17. The method of claim 10, wherein the identifier is a fixed identifier associated with the account or vehicle.

18. The method of claim 10, wherein the identifier is based on operational conditions of the vehicle when the vehicle is plugged into the charging station.

19. A charge management system comprising:

at least one processor; and memory comprising instructions that, when executed, cause the at least one processor to:

detect a charge session associated with a charging station communicatively coupled to the charge management system;

generate an encoded identification message that includes an identifier;

send the encoded identification message to the charging station, the encoded identification message configured to cause a vehicle connected to the charging station to alter a battery charging rate based on the identifier;

receive telematics data from the vehicle, the telematics data including the battery charging rate;

decode the identifier from the battery charging rate; and assign the charge session to an account associated with the vehicle based on the decoded identifier.

20. The charge management system of claim 19, wherein the encoded identification message comprises at least one of: a pilot signal that is configured to cause the vehicle to alter the battery charging rate to a specific battery charging rate based on the identifier or a sequence of pilot signals that are configured to cause the vehicle to alter the battery charging rate to a sequence of specific battery charging rates based on the identifier.

* * * * *